3,356,592
MULTI-STAGE FLASH EVAPORATOR WITH
RECIRCULATION OF DISTILLAND
Franklin J. Eubank, Glendora, N.J., and Dennis E. Johnson, Havertown, Pa., assignors to Westinghouse Electric Corporation, East Pittsburgh, Pa., a corporation of Pennsylvania
Filed Sept. 4, 1963, Ser. No. 306,526
2 Claims. (Cl. 203—11)

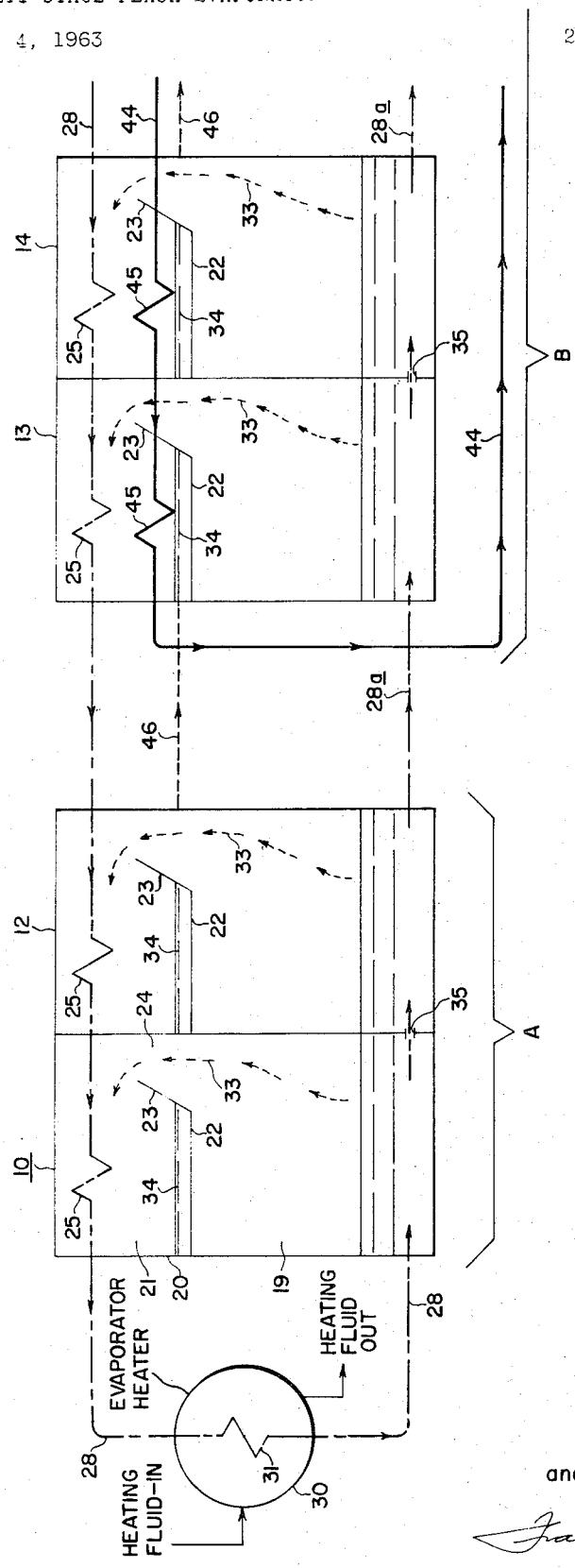
Fig.1A.
INVENTORS
Franklin J. Eubank
and Dennis E. Johnson
BY

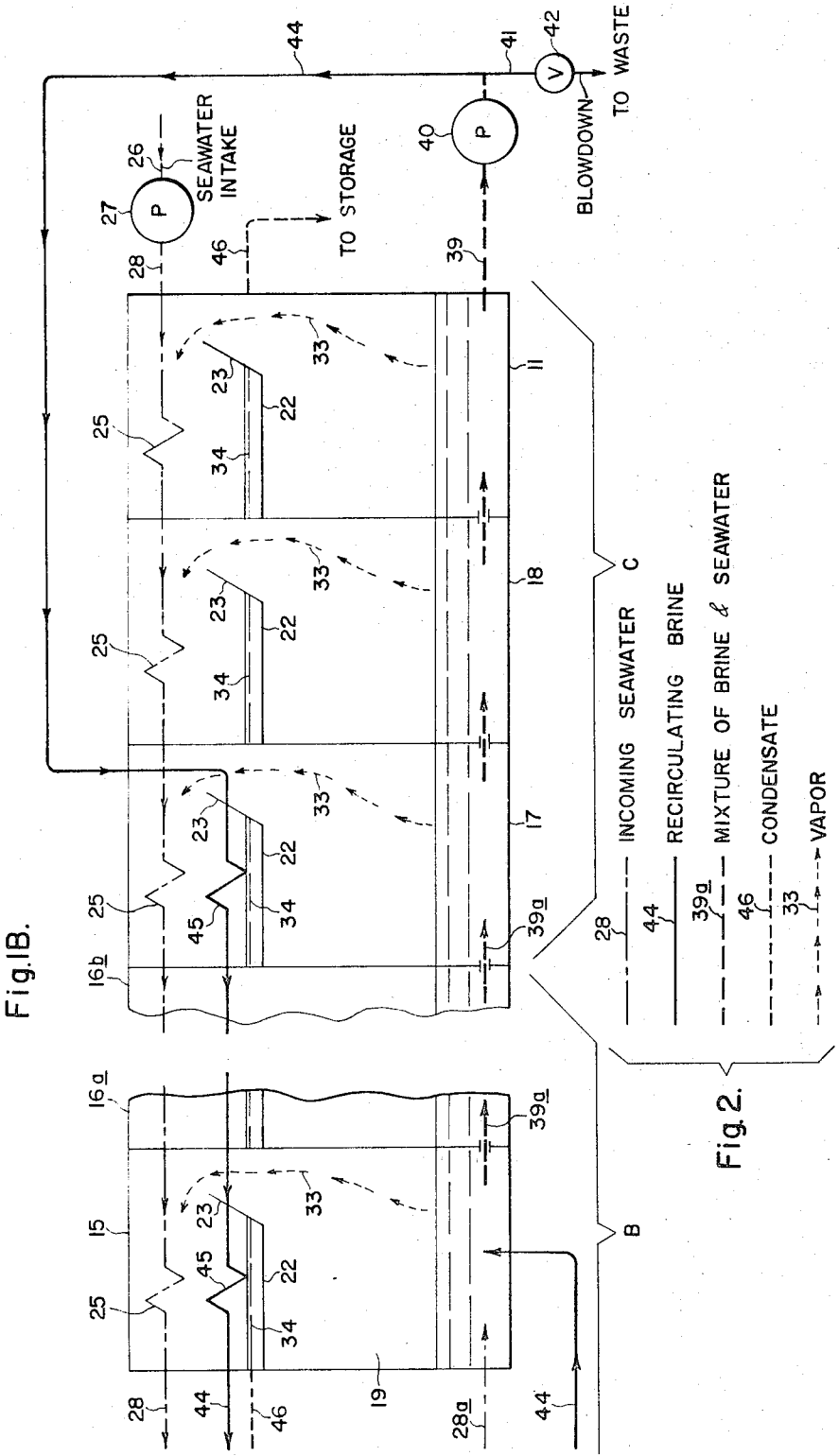

This invention relates to evaporators, more particularly to evaporators for converting impure water into comparatively pure water, for example sea-water or brackish water into potable water, and has for an object to provide a new and improved method and apparatus for purifying impure water.

The invention especially relates to multi-stage flash evaporator systems of the type in which the water to be evaporated is initially heated to a predetermined top temperature and is then directed through a plurality of flash chambers for flash evaporation at successively lower temperatures and pressures. In conventional evaporators of this type, after evaporation in the last flash chamber, a portion of the unvaporized concentrated water or "brine" is removed or "blown down" from the system and the remaining portion is mixed with new or "make-up" water and recirculated through the system. The resulting mineral concentration of this mixture is lower than that of the brine but higher than that of the make-up water.

When the water to be evaporated is a mixture of concentrated brine and new impure water, the resulting concentration tends to rapidly form a scale in the top temperature heater, if the top temperature is maintained above a certain critical temperature. Accordingly, to minimize scaling and its attendant undesirable effects, the top temperature heater is operated at or slightly below this critical temperature. For example, when sea-water is employed, the top temperature employed has been about 200° F. for operation with chemical additives.

Chemical treatment systems are now commercially available that effectively raise the critical temperature of the evaporator heater to about 250° F.

However, it is highly desirable to operate the evaporator at a still higher temperature in order to increase its thermal efficiency, thereby rendering the system capable of purifying more water with no increase in the capital cost of the equipment, or the same amount of water at a lower capital cost.

It is an object of the invention to provide a new and improved method and multi-stage flash evaporator apparatus of the above type that permit employment of a higher top temperature than heretofore deemed feasible, without increasing the scaling tendency in the top temperature heater.

Another object of the invention is to provide a multi-stage flash evaporator system of the recirculation type in which the water can be admitted to the first flash evaporation chamber at a higher temperature than heretofore with no increase in scaling effects.

Briefly, in accordance with the invention, there is provided a multi-stage evaporator system having a plurality of flash chambers, means for admitting impure make-up water to the system, means for recirculating a portion of the unevaporated brine leaving the last or lowest temperature and pressure flash chamber, means for removing a portion of the brine from the system, and a top temperature heater for heating the water before evaporation in the first or highest temperature and pressure chamber.

The recirculating brine is directed to an intermediate temperature and pressure chamber, while only the make-up water is directed through the top temperature heater.

Hence, since the mineral concentration of salinity of the "make-up" water is lower than that of the recirculating brine, the top temperature heater may be maintained at a higher temperature than heretofore, for example about 300° F., without undue scaling. Also, since the temperature and pressure drops successively from chamber to chamber, the temperature of the intermediate chamber may be stabilized at a value just below the critical temperature for undue scaling by the recirculating brine, for example 250° F. or less.

The improved method of operating the above apparatus briefly comprises:

(1) Admitting impure make-up water to the top temperature or evaporator heater;

(2) Heating the make-up water in said heater to a temperature above 250° F.;

(3) Flashing the thus heated make-up water in at least one stage from the highest temperature to a temperature below 250° F. to provide substantially pure water vapor;

(4) Initially mixing a portion of the brine leaving the lowest temperature stage with the unflashed water from the highest temperature stage or stages to provide a mixture having an initial temperature below 250° F.;

(5) Flashing the mixture in a plurality of successively lower temperature stages to provide additional pure water vapor;

(6) Removing from the system a portion of the brine leaving the lowest temperature stage; and (7) Condensing the vapors to provide purified water.

The above and the objects are effected by the invention as will be apparent from the following description and claims taken in connection with the accompanying drawings, forming a part of this application, in which:

FIGURES 1A and 1B are complementary schematic views jointly illustrating multi-stage flash evaporating apparatus arranged and operable in accordance with the invention; and FIG. 2 is a group of legends identifying the various flow circuits shown in FIGS. 1A and 1B.

Referring to the drawings in detail, FIGS. 1A and 1B jointly show a multi-stage flash evaporation system for converting impure water, for example sea-water or other brackish water, into substantially pure water, for example potable water. The system has been shown diagrammatically, since the structural arrangement thereof does not form a part of this invention and the various components may be formed in any suitable manner.

The system includes a plurality of stages from a first and highest temperature stage, generally designated 10, to a last and lowest temperature stage generally indicated 11 and the system may be arbitrarily divided into a first group of stages including the stage 10 and a stage 12, referred to hereafter as a first or high temperature stage group A, an intermediate group of stages 13, 14, 15, 16a and 16b hereafter designated stage group B, and a last or low temperature group of stages 17, 18 and 11, hereafter designated stage group C. The stages 16a and 16b are partially broken away to indicate that a plurality of additional similar stages (not shown) may be employed.

As well known in the art, the stage 10, as well as all of the other stages, is arranged to provide a flash evaporation chamber 19 disposed within the lower portion of a shell structure 20 and a vapor collection space 21 disposed above the flash evaporation chamber 19 and divided therefrom by suitable horizontal wall structure 22 defining a tray or receptacle 23 for collection of the condensate formed by the vapor generated by flashing in the flash evaporation chamber 19. The evaporation chamber 19 and the vapor collection space 21 are connected to each other by a vapor passageway 24.

In the vapor collection space 21 there is further provided a condenser or heat exchanger tube structure, generally designated 25, for condensing the vapor formed in the evaporation chamber 19, which condensate then drops into the tray 23.

All of the heat exchanger tube structures 25 are arranged in series flow relation with each other and the system further includes an intake 26 having a suitable water pump 27 for directing incoming impure water, such as sea-water or the like, through all of the heat exchangers 25 from the one in the last stage 11 to the one in the first stage 10, thereby progressively heating the make-up water and condensing the vapors in the collection spaces 21. The sea-water make-up conduit structure has generally been indicated by the dot and dash line 28 (see FIG. 2).

There is further provided a top temperature or evaporator heater 30 which, as well known in the art, may be provided with a heat exchanger tube structure 31 interposed in the make-up conduit 28, so that the make-up water is directed through the evaporator heater 30 and heated to its highest temperature before admission to the first or highest stage 10 of the system. Any heating fluid such as steam or the like may be employed to provide the heat in the evaporator heater 30.

After heating in the evaporator heater 30, the thus heated make-up water is directed into the flash evaporation chamber 19 of the first stage 10 and undergoes partial evaporation by the phenomenon known as "flashing," since the flash evaporation chamber is maintained at a lower pressurization value than that imposed by the water pump 27 on the make-up water in the make-up conduit 28. Accordingly, the vapor rises upwardly through the passageway 24 from the evaporation chamber 19 to the vapor collection space 21, as indicated by the dotted arrows 33 (also see FIG. 2), and undergoes heat exchange with the make-up water flowing through the heat exchanger 25 disposed therein, with resulting condensation of the vapor and collection in the tray 23, as indicated at 34.

The stages 10 and 12 are provided with a communicating orifice 35, so that the unflashed water from stage 10 flows into stage 12. The stage 12 is maintained at a lower pressurization value than stage 10. Hence, additional partial flash evaporation is attained, in substantially the same manner as described in connection with the stage 10.

Each of the flash evaporation stages, from the first stage 10 to the last stage 11, is maintained at a succeedingly lower temperature and pressure value and each flash evaporation chamber is disposed in restricted flow communication with its adjacent flash evaporation chamber, so that the unevaporated water from one stage flows into the next stage for additional partial evaporation, in sequence from the highest stage 10 to the lowest stage 11. This flow circuit from stage 10 to stage 15 has been indicated by the dot and dash line 28a and from stage 15 to the exit of stage 11 by the heavy dashed line 39a (also see FIG. 2).

The unflashed water from the last and lowest temperature stage 11 is withdrawn therefrom by suitable conduit structure, as indicated by the heavy dashed line 39, as a brine of increased salinity or mineral concentration. This brine is directed through a suitable pump 40 and then a portion of the brine is "blown down" or directed to waste through a suitable conduit 41, under the control of an adjustable valve 42, while the remaining portion of the thus withdrawn brine is returned to the system for recirculation, by conduit structure, indicated by the heavy solid line 44 (also see FIG. 2).

The intermediate stage group B, as well as the first stage 17 of the last stage group C, is provided with additional condensers or heat exchanger tube structures 45 connected in series with each other and with the recirculating brine conduit 44, so that, as the brine is returned to the system, it is first additionally heated in a progressive manner by heat exchange with the vapors formed in the stages 17 to 13, inclusive, thereby augmenting the condensation of the vapors formed therein, and is then directed into the flash evaporation chamber 19 of the stage 15 and mixed with the make-up water flowing thereinto from the immediately preceding stage 14. The resulting mixture of brine and original make-up water that has been partially evaporated in stage group A and the upper stages 13 and 14 of group B is thus modified in concentration and proceeds as a single stream 39a through the remaining lower stages 16a to 11 to complete the cycle.

The condensate 34 collecting in the trays 23 of each of the stages may be directed through suitable conduit structure, as indicated by the light dash lines 46, as water for useful consumption purposes and directed to a suitable storage device (not shown).

With the system described above, the incoming sea-water or make-up water is at a lower salinity or mineral concentration level than that of the brine leaving the last and lowest stage. Hence, its scale producing tendency is considerably lower than that of the withdrawn brine from the last stage 11.

Accordingly, by directing the make-up sea-water to the evaporator heater 30 without further concentration by the withdrawn brine, the heater 30 may be operated at a higher temperature value than heretofore, to permit heating of the water for evaporation in the first stage 10 at a higher temperature than heretofore, without increase in the scaling tendency of the water in its flow through the tube structure 31 of the evaporator heater 30.

This phenomenon is also attained in the higher temperature stages, for example the stage group A as well as the stages 13 and 14 in group B since, although the make-up water undergoes some evaporation in the stages 10 to 14, inclusive, it is still at a lower salinity level than that of the withdrawn brine leaving the last stage 11.

Since the brine flow 39 leaving the last stage 11 does contain some sensible heat, it is desirable to recirculate a portion of this withdrawn brine through a portion of the system, as indicated by the solid line 44. Accordingly, after preheating the brine in the heat exchangers 45, the brine is directed into the stage 15 for additional vaporization as a mixture with the water coming into the stage 15 from the preceding stage 14. The water for evaporation in stage 15 and the lower stages is a mixture of modified concentration somewhat higher in concentration than that of the water flow 28a leaving the stage 14, but of lower concentration than that of the brine flow 44 admitted to the stage 15.

According to the invention, the brine withdrawn from the last and lowest stage 11 is of such salinity, that if even a small portion of this brine is modified with fresh sea-water as make-up for the system, such a mixture cannot be heated above 160° F. before initial evaporation, without serious scaling effects upon the evaporator heater 30. Nor can it be feasibly heated above 250° F. even when presently known chemical treatments are employed.

Heretofore, it has been the practice in the prior art to mix a portion of the brine with the make-up water and chemical additives or pretreated make-up liquids before heating in the evaporator heater, and then initially flashing the thus heated mixture in the highest stage. With such prior apparatus and method the heating effect of the evaporator heater necessarily had to be held to a value only sufficient to heat the water to a temperature of 250° F. or less.

*Method of operation*

When sea-water is employed as make-up water for utilization in the flash evaporation system described above, such sea-water is normally taken into the system at the intake 26 at a value less than 100° F. and generally on the order of about 80° F.

During its flow through the heat exchangers 25 of all the stages in the system, the newly intaken make-up seawater undergoes a progressive rise in temperature from about 85° F. at the intake 26 to a value of about 225° F. upon leaving the heat exchanger 25 of the first and highest stage 10. Accordingly, the make-up water is admitted to the evaporator heater 30 at a relatively high value.

To maintain the system at its optimum thermal efficiency of operation without undue scaling, the evaporative heater 30 is maintained at a heat level sufficient to heat the newly intaken make-up water stream flowing through the tube structure 31 to a value substantially above 250° F., for example on the order of about 300° F.

The thus highly heated water is then flashed into vapor in the first and highest stage 10 at a value of about 290° F. As the water not evaporated in the first stage 10 undergoes succeeding partial evaporation in the subsequent stages 12, 13 and 14 it concomitantly loses some of its high heat content and enters the stage 15 at a value on the order of about 250° F., or slightly less, mixes with the reheated recirculating brine, and undergoes additional evaporation therein as previously explained.

The brine and water mixture employed in the flash evaporation stage 15 is at a modified concentration level, suitable for evaporation in the stage 15 at a temperature of about 250° F. without serious scaling effects therein or the subsequent and lower stages 16a, 16b, 17, 18 and 11. A part of the withdrawn brine from the last stage is directed to waste by the conduit 41, to maintain stabilization of the salinity level of the entire system, and the remaining portion is directed through the conduit structure 44 to the heat exchangers 45, thereby absorbing additional heat before admission to the stage 15. During its flow through the heat exchangers 45, the recirculating brine is heated to a value of slightly less than 250° F.

Since the optimum operating temperature of the system according to the invention may be on the order of about 300° F., whereas heretofore it was only on the order of about 250° F., the capacity of the system is increased with attendant economies in operation, thereby permitting a greater quantity of potable water to be produced with the same equipment. Conversely, the same amount of water as heretofore produced may be produced with lower total cost equipment.

At least some of the heat released in the lower stages 18 and 11 by evaporation therein heretofore has been necessarily rejected from the system by employing seawater as a coolant. However, with this invention, the heat released in these last two stages is not rejected from the system but is removed from these two stages by the heat exchangers 25 therein and employed to preheat the make-up water. Hence, the only heat rejected from the system, besides the heat unavoidably lost through radiation, conduction, etc., and the heat in the purified water, is the heat contained in the brine that is blown down from the system through conduit 41. Accordingly, this feature further enhances the operating efficiency of this system.

Although only one embodiment and method of practicing the invention has been shown and described, respectively, it is to be understood that numerous changes and modifications of the invention are feasible and may be made without departing from the spirit and scope of the invention.

We claim as our invention:

1. A multi-stage flash evaporator system comprising,
means forming a plurality of flash evaporation chambers,
first heat exchange means associated with each of said evaporation chambers for cooling the vapors formed therein,
primary means for directing a stream of incoming impure water successively through each of said first heat exchange means to cool said vapors and preheating said impure water,
said chambers including a first group, an intermediate group and a last group,
said intermediate group including at least first, second and third chambers operable at successively lower temperatures,
heating means interposed between the first heat exchange means in said first group and the chambers in said first group for imparting additional heat to said impure water,
means for directing the heated impure water from said heating means to said first group of chambers for partial evaporation,
means providing fluid communication between said respective chambers, whereby the heated impure water undergoes successive partial evaporation in each of said chambers of said groups,
means for conducting the unevaporated water from said last group of chambers as a brine of increased mineral concentration,
means for directing a portion of said brine from said last group of chambers to waste,
second heat exchange means cooperatively associated with the chambers of said intermediate group for augmenting the condensation of the vapors formed therein, and
secondary means for returning the remaining portion of said brine through said second heat exchange means, and means disposed in bypassing relation with said first and second chambers for directing the brine from said second heat exchange means to said third chamber in said intermediate group of chambers, whereby the returning brine and the impure water from the second chamber of the intermediate group of chambers form a mixture of modified concentration in said third chamber.

2. In a process of multi-stage flash evaporation of impure salt water to recover pure water, the steps of (1) flashing the salt water in a plurality of successively staged flash evaporation chambers to form vapor, (2) cooling the vapor formed therein with a first heat exchange fluid associated with each of said flash evaporation chambers, (3) pumping a stream of incoming salt water as said first heat exchange fluid to cool said vapor and preheat the impure salt water, (4) said chambers prevailing in a first zone, an intermediate zone and a last zone, said intermediate zone including at least first, second and third chambers operable at successively lower temperature and pressure, (5) heating the salt water as the first heat exchange fluid successively in the last, intermediate and the first zone and then adding additional heat in an external heater to the impure salt water, (6) directing the heated impure salt water from the external heater to the respective chambers successively in the first, intermediate and last zones for partial flash evaporation in the respective chambers, (7) conducting unevaporated salt water from the last chamber of the third zone as brine of increased mineral concentration, (8) directing a portion of said brine of increased mineral concentration to waste, (9) returning a remainder portion of said brine as a second heat exchange fluid cooperatively associated with the chambers of said intermediate zone for augmenting condensation of vapor found therein, (10) by-passing the first and second chambers of the intermediate zone with the remainder portion after the second heat exchange and directing said remainder portion to the third chamber of the intermediate zones whereby the remainder portion and the salt water from the second chamber of the intermediate zone form a mixture of modified concentration in said third chamber.

(References on following page)

References Cited

UNITED STATES PATENTS

| | | |
|---|---|---|
| 2,759,882 | 8/1956 | Worthen et al. 202—174 X |
| 2,803,589 | 8/1957 | Thomas 203—88 X |
| 2,959,524 | 11/1960 | Goeldner 203—11 |
| 3,105,020 | 9/1963 | Silver et al. 202—173 X |
| 3,119,752 | 1/1964 | Checkovich 203—11 |
| 3,194,747 | 7/1965 | Ris et al. 202—173 |
| 3,218,241 | 11/1965 | Checkovich 203—10 X |
| 3,236,747 | 2/1966 | Margiloff 203—11 |

OTHER REFERENCES

Publication: Saline Water Conversion (U.S. Dept. of Int. Symposium) (1958), pages 105–113.

NORMAN YUDKOFF, *Primary Examiner.*

F. E. DRUMMOND, *Assistant Examiner.*